Nov. 10, 1925.
E. S. AVERY
1,560,524
PULLEY
Filed July 9, 1924
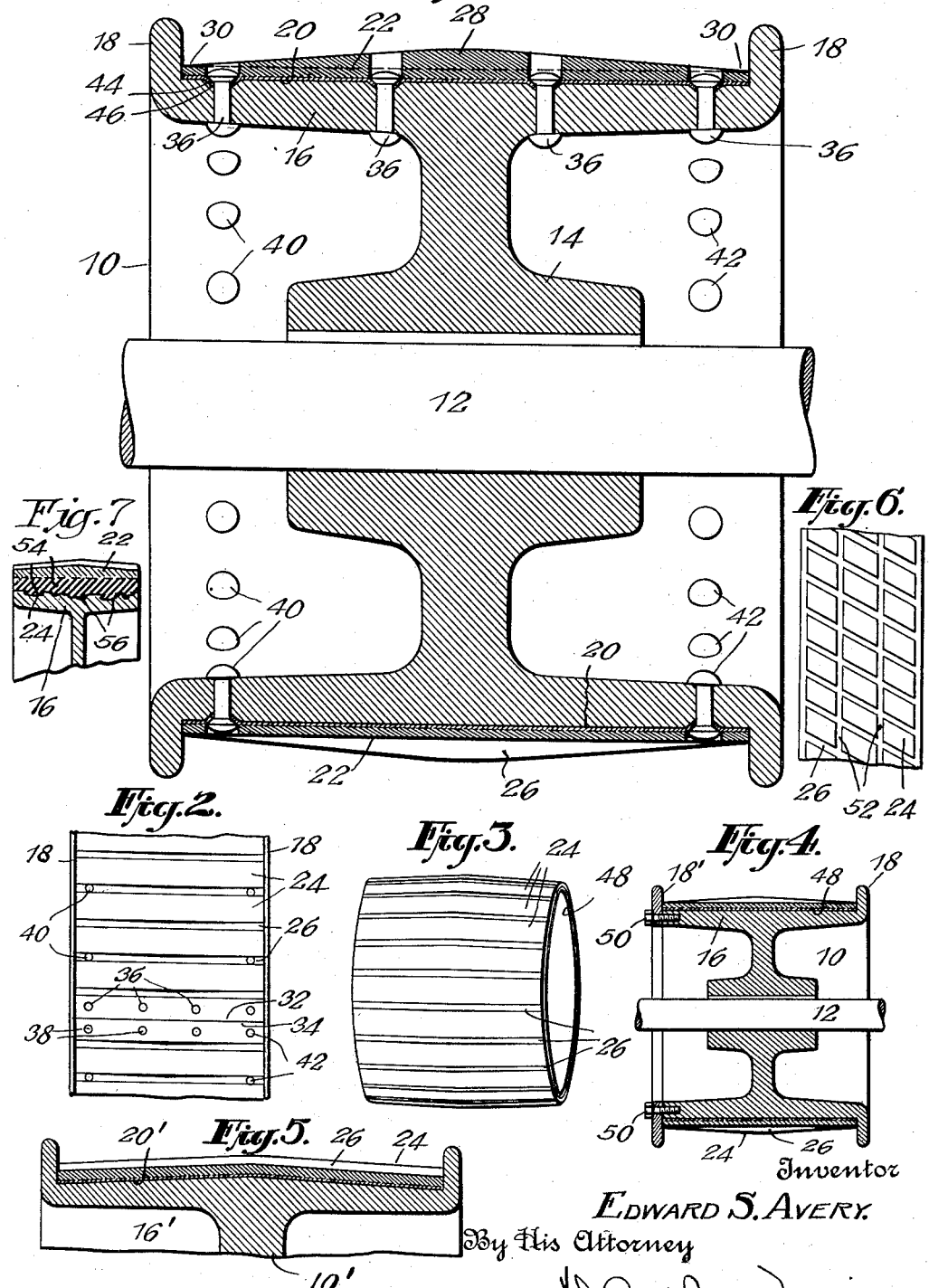
Inventor
EDWARD S. AVERY.
By His Attorney Patented Nov. 10, 1925.

1,560,524

UNITED STATES PATENT OFFICE.

EDWARD S. AVERY, OF EAST HAMPTON, NEW YORK.

PULLEY.

Application filed July 9, 1924. Serial No. 724,958.

*To all whom it may concern:*

Be it known that I, EDWARD S. AVERY, a citizen of the United States, and a resident of East Hampton, in the county of Suffolk and State of New York, have invented certain new and useful Improvements in Pulleys, of which the following is a specification.

This invention relates to improvements in pulleys and aims to provide means which will prevent slippage of the power transmitting belt coacting with the pulley. It is well known that with the smooth faced pulleys in common use that the belt slippage results in loss of power and also prematurely wears out the belt. My improved pulley contemplates a provision of a coating for the driving face thereof which will offer a great frictional coaction with the belt trained over the same. Smooth faced pulleys heretofore used, when rotating at fairly high speeds tend to pocket a thin layer of air between the belt and the pulley face and this air film acts somewhat like a lubricant between the belt and pulley face and permits one to slip relatively to the other. My improved pulley is provided with an interrupted surface which is adapted to permit the belt to force the air outwardly to overcome such slippage.

Further characteristics and advantages of the invention will be apparent from the following specification and the novel features will be pointed out with particularity in the appended claims.

The accompanying drawings illustrate embodiments of the invention wherein Fig. 1 is a longitudinal section illustrating a flanged pulley;

Fig. 2 is a development on a small scale of a driving element shown in Fig. 1;

Fig. 3 is a detail perspective illustrating a metallic sleeve having a coating of resilient material thereon which is adapted to increase the frictional coaction between the pulley and the belt;

Fig. 4 is a section similar to Fig. 1 on a smaller scale showing a slightly modified construction;

Fig. 5 is a fragmentary sectional detail illustrating a further alternative construction;

Fig. 6 is a detail illustrating a further modification;

Fig. 7 is a detail of a further modification.

Referring in detail to the drawings, 10 illustrates a pulley of suitable construction which is keyed or otherwise secured to a power transmitting shaft 12 the pulley shown having an integral hub 14, rim 16 and side flanges 18. Between the flanges 18 and in contact with the outer periphery of the rim 16, I attach a sleeve or sheet of metal which has previously had secured thereto a layer or coating of material adapted to exert a better friction grip on the power transmitting belt than that exerted by metal or wooden pulleys heretofore used. I preferably use rubber for this coating and mold it or otherwise shape it so as to form an interrupted or non-skid belt engaging surface.

As illustrated in Figs. 1 and 2, the sleeve 20 is a somewhat flexible sheet of metal to which is vulcanized a layer of rubber 22. The surface of this rubber layer is molded so as to present an interrupted or non-skid surface. In the particular embodiment shown this non-skid surface takes the form of a series of transversely extending raised blocks 24 with depressions 26 between them. In cross-section the blocks are crowned. That is to say, they are higher at the middle point as at 28 than at the edges 30.

The sleeve or metal sheet shown in Figs. 1 and 2 is formed by wrapping a practically flat sheet which has previously been coated with rubber as above described, around the rim 16 of the pulley and abutting its edges 32 and 34 and securing it to the rim by transverse rows of rivets 36 and 38 which are suitably countersunk so that the heads thereof do not extend beyond the driving surface of the pulley as clearly illustrated in Fig. 1. Near each edge of the sleeve is secured a series of rivets 40 and 42 spaced at substantially equal distances around the periphery. These latter rivets are preferably, although not necessarily, located in line with the depressions 26 between the non-skid blocks. At the points where the rivets pass through the metal sheet or sleeve 20, I preferably press the metal to form seats for the rivet heads as shown at 44, the latter being adapted to be seated in countersunk holes 46 formed in the rim of the pulley.

Instead of using a flat sheet to form the sleeve 20 and wrapping it around the flanged pulley as above described, I may provide an integral or continuous cylinder 48 as shown in Fig. 3 and to this cylinder I may vulcanize or otherwise secure a rubber coating provided with alternate blocks or ridges 24 and grooves or depressions 26. The cylinder 48 may be made of stock tubing or may be rolled from flat sheets the abutting ends of which are welded or otherwise secured. When this form of non-skid surface is to be applied to a flanged pulley one of the flanges of the latter will be made detachable as illustrated in Fig. 4 wherein the flange 18 at the right is integral with the pulley 10 as in Fig. 1 but the flange 18' at the left is in the form of a detachable ring which is secured to the rim 16 of the pulley by suitable bolts 50 as shown.

In the pulley shown in Figs. 1 and 4, the outer surface of the rim is of true cylindrical surface and the crowning is obtained by molding the rubber layer to the appropriate cross-section as described. Now the sleeve 20 or the sleeve 48 as above described may be attached to existing pulleys by first turning the latter in the lathe so as to remove the crowning therefrom or in other words to true the outer surface of the rim 16 to a substantially cylindrical form. Ordinarily, when the pulleys are manufactured according to my invention they will be initially formed with an outer cylindrical rim.

It is possible, however, to apply my invention to crowned pulleys of usual shape after turning the rims down to a cylindrical shape. This adaptation of the invention is illustrated in Fig. 5 wherein the sleeve 20' is crowned or arched transversely to fit the crowning of the rim 16' of the pulley 10'. This plate 20' is provided with a layer or coating of rubber which latter is formed with suitable ridges or blocks 24 and depressions or grooves 26 similar to those above described.

In the drawings, the blocks 24 are shown of rectangular shape extending transversely across the face of the pulley in lines perpendicular to the sides of the pulley. It is, of course, to be understood that these blocks may extend obliquely or they may be arranged in herring bone fashion, that is, with portions extending outwardly in a transverse direction from each side of the center at opposite angles. And instead of the blocks or ridges 24 extending continuously from one side to the other they may be also interrupted by forming grooves therein as shown at 52 in Fig. 6.

By interrupting the driving surface of the pulley, the air is allowed to escape by way of the depressions in the surface of the pulley and hence slippage from the formation of an air pocket or film between the belt and pulley is avoided.

The pulley therein described is well adapted for service out of doors wherein it is subjected to the action of the elements. For example, this pulley can be effectively used on the armature shaft of dynamos used for railway car lighting or for the drive pulleys used on railway car axles. In such uses the rubber coating protects the pulley against the erosive action of the elements. Snow or sleet will not readily adhere thereto as it will in the case of wooden pulleys and iron pulleys heretofore used. It is well known to railway mechanics that snow, sleet and rain cause serious difficulties with pulleys heretofore used. When snow is picked up by my improved pulley or when ice forms thereon in a thin film from water thrown up from the roadbed, pressing or squeegee action between the adjacent blocks of yielding or resilient material, tends to break up the ice film or dislodge the packed snow which is readily thrown off by centrifugal force as the pulley revolves.

The rubber coating may be applied to the sleeve 20 as above described and this sleeve in turn attached to the pulley or such coating may be applied directly to the rim of the pulley. It is also to be understood that instead of using a continuous layer of rubber or other resilient coating, I may apply to the pulley a series of transverse blocks or ridges which are unconnected with one another.

The interrupted surface or belt engaging portion of the pulley may be formed of resilient material other than rubber such as friction cloth or cotton fabric impregnated with rubber such as that used in the manufacture of automobile tires. The belt engaging portion of the pulley whether made of rubber or rubberized fabric may be either cemented or vulcanized to the belt rim. While I do not wish to be limited thereto, I prefer when applying a rubber or rubberized fabric coat to a metal pulley, to first plate either the rim of the pulley or the metal sleeve to which the belt engaging portion is to be secured, with a metal alloy of copper, zinc and antimony. The proportions of the various metals of this alloy may be varied somewhat but I find that best results are obtained by an alloy consisting of approximately 62⅔% copper, 33⅔% zinc and 3 and a fraction percent antimony. The belt engaging portion of the pulley is applied to the surface of this alloy metal and the whole is heated to the vulcanizing temperature of approxoimately 250° Fahrenheit for a period of approximately forty minutes. During this vulcanization the pulley may be enclosed in a suitable mold so as to form the transverse ridges and depressions or these may be formed prior to applying the rubber coating to the pulley.

In the various embodiments above described, the soft or yielding rubber is secured directly to either the rim of a pulley or to a metal sleeve fastened to such rim. In some cases, however, I may mold or otherwise secure a layer of hard rubber or so-called vulcanite 54 to the rim 16 of the pulley as shown in Fig. 7. To this layer of hard rubber, I will vulcanize a layer 22 of softer or more yielding rubber and this layer will preferably be provided with raised portions 24 and depressions so as to form a non-skid surface. In order to key or interlock the layer 54 with the pulley rim, I may roughen the latter as indicated at 56 either by forming irregular under-cut portions when casting the pulley or by machining dove-tail or T-shape slots or by sand-blasting the surface of the rim.

Though I have described with great particularity the particular embodiments of the invention herein illustrated, it is not to be construed that I am limited thereto as various modifications may be made by those skilled in the art without departing from the invention as defined in the appended claims.

What I claim is:—

1. A metallic pulley having an outer coating of metal differing from the body portion of the pulley and a layer of resilient material vulcanized directly to the outer coating of the pulley.

2. A pulley of ferrous metal having an outer coating of non-ferrous metal to the surface of which is directly secured a rubber layer to present a non-skid belt engaging surface.

3. A pulley covering including a metal base consisting of an alloy of copper, zinc and antimony and a rubber coating vulcanized thereto.

4. A pulley formed of two dissimilar metals, a layer of rubber secured to the face of the pulley, the portion of the pulley forming the face thereof being of a metal possessing characteristics peculiarly adapted for securing said layer of rubber thereto.

5. A metallic pulley the face of which is plated with a coating of cuprous metal and a layer of rubber vulcanized to said cuprous coating.

6. A metallic pulley the face of which is plated with a coating of cuprous metal and a layer of rubber vulcanized to said cuprous coating, said layer of rubber being formed with a non-skid belt engaging surface.

7. A pulley having a metallic sleeve secured thereto, said sleeve being plated with an alloy of copper, zinc and antimony and having a rubber coating vulcanized thereto.

8. A pulley having a metallic sleeve secured thereto, said sleeve being plated with an alloy of copper, zinc and antimony and having vulcanized thereto a layer of rubber formed with a series alternate ridges and depressions to form a non-skid surface.

In witness whereof, I have hereunto signed my name.

EDWARD S. AVERY.